US009732596B2

(12) United States Patent
Ollier et al.

(10) Patent No.: US 9,732,596 B2
(45) Date of Patent: Aug. 15, 2017

(54) METHOD AND APPARATUS FOR PRODUCING HYDROCARBONS FROM ONE SUBSEA WELL

(71) Applicant: ITP SA, Louveciennes (FR)

(72) Inventors: Pierre Ollier, Boulogne Billancourt (FR); Jean-Aurélien Damour, Louveciennes (FR); Ludovic Villatte, Poissy (FR)

(73) Assignee: ITP SA, Louveciennes (FR)

( * ) Notice: Subject to any disclaimer, the term of this patent is extended or adjusted under 35 U.S.C. 154(b) by 0 days.

(21) Appl. No.: 15/259,342

(22) Filed: Sep. 8, 2016

(65) Prior Publication Data

US 2017/0067326 A1 Mar. 9, 2017

(30) Foreign Application Priority Data

Sep. 8, 2015 (FR) ...................................... 15 01853

(51) Int. Cl.
| | | |
|---|---|---|
| *E21B 17/01* | (2006.01) | |
| *E21B 43/013* | (2006.01) | |
| *E21B 17/08* | (2006.01) | |
| *E21B 36/00* | (2006.01) | |
| *E21B 43/01* | (2006.01) | |
| *F16L 59/14* | (2006.01) | |

(52) U.S. Cl.
CPC ............ *E21B 43/013* (2013.01); *E21B 17/01* (2013.01); *E21B 17/085* (2013.01); *E21B 36/003* (2013.01); *E21B 43/0107* (2013.01); *F16L 59/143* (2013.01)

(58) Field of Classification Search
CPC ...... E21B 17/01; E21B 17/085; E21B 19/004; E21B 36/003; E21B 43/0107; E21B 43/013

See application file for complete search history.

(56) References Cited

U.S. PATENT DOCUMENTS

| 5,159,982 | A | * | 11/1992 | Hynes | ................... | E21B 33/038 |
|---|---|---|---|---|---|---|
| | | | | | | 166/345 |
| 5,862,866 | A | * | 1/1999 | Springer | ................. | E21B 17/00 |
| | | | | | | 166/380 |
| 6,000,438 | A | * | 12/1999 | Ohrn | ....................... | E21B 17/01 |
| | | | | | | 138/149 |
| 6,305,429 | B1 | * | 10/2001 | Welch | ....................... | F16L 7/02 |
| | | | | | | 138/112 |
| 8,061,739 | B2 | * | 11/2011 | Marchal | ................ | E21B 17/042 |
| | | | | | | 285/123.1 |
| 9,140,077 | B2 | * | 9/2015 | Cupolillo | ................ | E21B 17/01 |

(Continued)

FOREIGN PATENT DOCUMENTS

| FR | GB 2396196 | A | * | 6/2004 | ................ | F16L 9/18 |
|---|---|---|---|---|---|---|
| GB | WO 0150058 | A1 | * | 7/2001 | ................ | F16L 1/18 |

*Primary Examiner* — Matthew R Buck
(74) *Attorney, Agent, or Firm* — Oliff PLC

(57) ABSTRACT

A method of commissioning one subsea hydrocarbon well terminating by a wellhead, wherein, from a petroleum drilling rig, the method includes: screwing double-walled pipe segments together in mutual succession to form a thermally insulated floor-to-surface 1 hydrocarbons, and an outer pipe, between which pipes a thermally insulating material is disposed; connecting the floor-to-surface link pipe to wellhead; and extracting the hydrocarbons via the floor-to-surface link pipe to the drilling rig on the surface.

15 Claims, 7 Drawing Sheets

(56) References Cited

U.S. PATENT DOCUMENTS

2002/0195158 A1* 12/2002 Turner .................. F16L 59/20
138/155
2014/0375049 A1* 12/2014 Mair .................... F16L 58/181
285/123.1

* cited by examiner

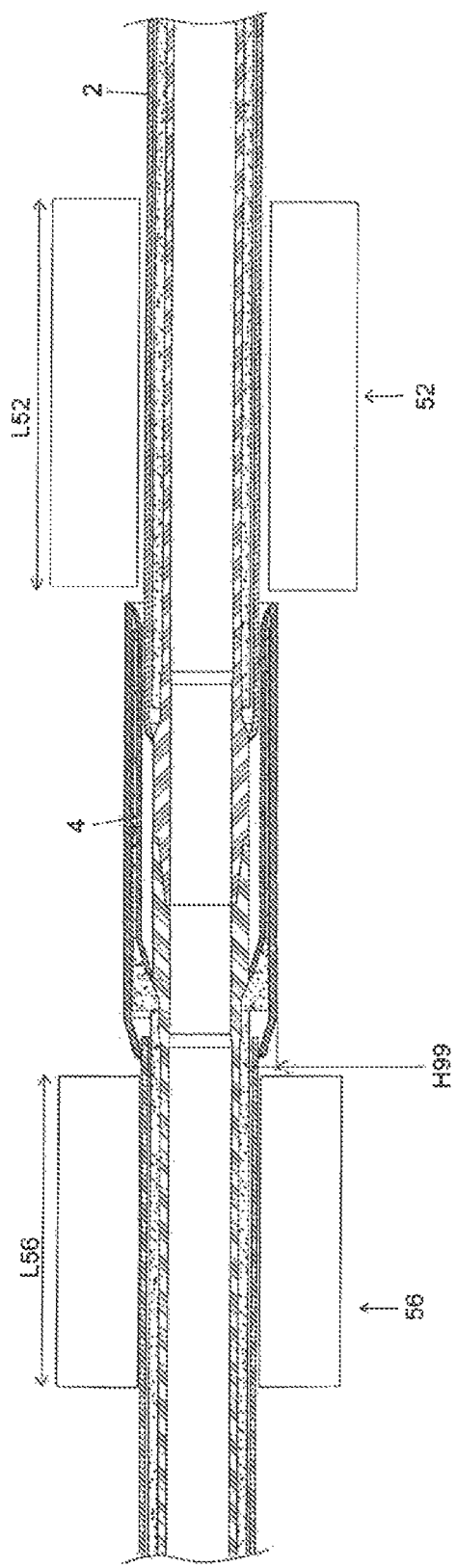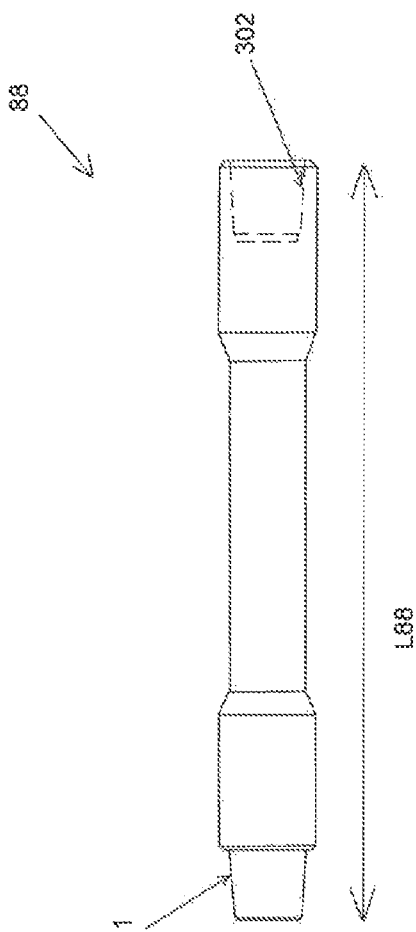

METHOD AND APPARATUS FOR PRODUCING HYDROCARBONS FROM ONE SUBSEA WELL

BACKGROUND OF THE INVENTION

1. Field of the Invention

The present invention relates to the technical field of apparatus for producing hydrocarbons from one or more subsea wells.

2. Description of the Related Art

Operating subsea wells generally comprises a drilling phase during which the wellheads and other subsea installations on the sea floor are implemented, followed by a phase during which the permanent pipes from the sea floor to the sea surface are installed. For example, a wellhead may be situated at a depth greater than 500 meters (m), or indeed greater than 3,000 m. Production, i.e. commissioning, only begins after the arrival of a hydrocarbon collection and pretreatment vessel also known as a "Floating Production, Storage and Offloading" (FPSO) unit.

It is thus possible for a period of a few weeks to a few months to elapse between the end of the drilling phase and the start of production. A subsea hydrocarbon field can typically produce in the range 50,000 barrels of oil per day to 200,000 barrels of oil per day. The shortfall resulting from that period is thus particularly large, in particular since the investment for implementing subsea installations for producing hydrocarbons is considerable. Typically, the cost of developing an offshore field is several billion US dollars.

SUMMARY OF THE INVENTION

An object of the present invention is to enable a subsea well or a plurality of interconnected subsea wells to be commissioned as quickly as possible.

This object is achieved by means of a method of commissioning at least one subsea hydrocarbon well terminating by a wellhead, the method being characterized in that, from a petroleum drilling rig, it consists in:
- screwing double-walled pipe segments together in mutual succession to form a thermally insulated floor-to-surface link pipe comprising an inner metal pipe for transporting hydrocarbons, and an outer metal pipe, between which pipes a thermally insulating material is disposed;
- connecting the floor-to-surface link pipe to said wellhead; and
- extracting the hydrocarbons via the floor-to-surface link pipe to the drilling rig on the surface.

In accordance with a feature of the invention, each double-walled pipe segment comprises:
- a single-walled connection and transport inner metal pipe, resistant to open-sea stresses and provided with first and second threaded reinforced ends;
- a female metal bayonet-piece disposed around said first threaded reinforced end, the female bayonet-piece comprising a cylindrical portion extended at one end by a narrower portion that is welded or otherwise bonded to a tightening portion of said first threaded reinforced end, and at the other end by a wider portion;
- a portion of said thermally insulating material disposed around the single-walled connection and transport pipe segment and around the female bayonet-piece;
- an outer metal pipe provided with a narrower portion welded or otherwise bonded to a tightening portion of said second threaded reinforced end; and
- a metal cover-piece disposed around the female bayonet-piece, the cover-piece having a cylindrical portion welded or otherwise bonded at one end to the wider end portion of the female bayonet-piece, and being extended at the other end by a narrower portion welded or otherwise bonded to the outer pipe;

each pipe segment being arranged in such a manner that tightening torque can be applied for the screwing together by tightening tongs applied against its outer pipe.

In accordance with another feature of the invention, the tightening torque for tightening two adjacent double-walled pipe segments is exerted by two tightening tongs exerting their action on the outer pipe of each double-walled pipe segment at either end of and as close as possible to the cover-piece of one of the two double-walled pipe segments in such a manner as to transmit the tightening torque to the reinforced ends that are screwed together at said cover-piece.

In accordance with another feature of the invention, at least one safety or backup stop clamp is positioned prior to the screwing together, the cover-piece forming a shoulder between its maximum diameter and its minimum diameter, which shoulder forms a bearing surface against said safety or backup stop clamp.

In accordance with another feature of the invention, in each double-walled pipe segment, the female bayonet-piece has a maximum diameter lying in the range 130% of the diameter of the tightening portion of the first threaded reinforced end to 170% of said tightening diameter.

In accordance with another feature of the invention, in each double-walled pipe segment, the inside diameter of the cylindrical portion of the female bayonet-piece is greater than the outside diameter of the outer pipe, the female bayonet-piece coming ahead of said first threaded reinforced end in such a manner as to overlap the outer pipe of an adjacent double-walled pipe segment so as to form continuity in the thermal insulation of the floor-to-surface link pipe.

In accordance with another feature of the invention, in each double-walled pipe segment, the thermally insulating material is of the solid type having open pores, and is based on fumed silica, the closed and sealed space disposed between the outer pipe and the single-walled connection and transport pipe segment being put at a low pressure.

In accordance with another feature of the invention, in each double-walled pipe segment, the threaded reinforced ends of the single-walled connection and transport pipe segment are made of a first steel having very high yield strength of at least 100 kilopounds per square inch (ksi) and preferably at least 120 ksi, while the cover-piece, the female bayonet-piece, and the outer pipe are made of a same second steel having high yield strength of at least 65 ksi and preferably at least 80 ksi.

In accordance with another feature of the invention, after a determined period of extraction:
- production is temporarily stopped;
- the floor-to-surface link pipe is disassembled by successively unscrewing or "breaking out" and storing the double-walled pipe segments; and
- a new floor-to-surface link pipe is installed.

In accordance with another feature of the invention, the double-walled pipe segments are stored with a view to them being re-used for another subsea hydrocarbon well.

The invention also provides a floor-to-surface link pipe for commissioning at least one subsea hydrocarbon well terminating by a wellhead, said floor-to-surface link pipe being made up of a set of mutually interconnected double-walled pipe segments, said floor-to-surface link pipe being characterized in that each double-walled pipe segment comprises:

a single-walled connection and transport inner metal pipe segment, resistant to open-sea stresses and provided with first and second threaded reinforced ends;

a female metal bayonet-piece disposed around said first threaded reinforced end, the female bayonet-piece comprising a cylindrical portion extended at one end by a narrower portion that is welded or otherwise bonded to a tightening portion of said first threaded reinforced end, and at the other end by a wider portion;

a portion of said thermally insulating material disposed around the single-walled connection and transport pipe segment and around the female bayonet-piece;

an outer metal pipe provided with a narrower portion welded or otherwise bonded to a tightening portion of said second threaded reinforced end; and a metal cover-piece disposed around the female bayonet-piece, the cover-piece having a cylindrical portion welded or otherwise bonded at one end to the wider end portion of the female bayonet-piece, and being extended at the other end by a narrower portion welded or otherwise bonded to the outer pipe;

each double-walled pipe segment being arranged in such a manner that tightening torque can be applied for screwing the inner pipes together by tightening tongs applied against its outer pipe.

In accordance with another feature of the invention, the tightening torque for tightening two adjacent double-walled pipe segments is exerted by two tightening tongs exerting their action on the outer pipe of each double-walled pipe segment at either end of and as close as possible to the cover-piece of one of the two double-walled pipe segments in such a manner as to transmit the tightening torque to the reinforced ends that are screwed together at said cover-piece.

Advantageously, the pipe is provided with at least one safety or backup stop clamp prior to the screwing together, the cover-piece forming a shoulder between its maximum diameter and its minimum diameter, which shoulder forms a bearing surface against said safety or backup stop clamp.

In accordance with another characteristic, in each double-walled pipe segment, the female bayonet-piece has a maximum diameter lying in the range 130% of the diameter of the tightening portion of said first threaded reinforced end to 170% of said diameter.

Also advantageously, in each double-walled pipe segment, the inside diameter of the cylindrical portion of the female bayonet-piece is greater than the outside diameter of the outer pipe, the female bayonet-piece coming in front of said first threaded reinforced end in such a manner as to overlap the outer pipe of an adjacent double-walled pipe segment so as to form continuity in the thermal insulation of the floor-to-surface link pipe.

Also advantageously, in each double-walled pipe segment, the threaded reinforced ends of the single-walled connection and transport pipe segment are made of a first steel having very high yield strength of at least 100 ksi and preferably at least 120 ksi, while the cover-piece, the female bayonet-piece, and the outer pipe are made of a same second steel having high yield strength of at least 65 ksi and preferably at least 80 ksi.

A first advantage is that the use of the thermally insulated floor-to-surface link pipe makes it possible to commission the well a few days after the drilling phase.

The floor-to-surface link pipe can be rapidly operational for extracting the hydrocarbons coming from one or more wellheads. This makes it possible to bring forward accordingly the receipts of money generated by operating the subsea petroleum field, and to optimize the financial results. Such production may, for example, reach in the range 5,000 barrels per day to 20,000 barrels per day, in particular due to the diameter of the floor-to-surface link pipe.

Here, commissioning is achieved at an early stage, this also being known as "early production", and, in addition, the commissioning of the invention is particularly reinforced against solidified blockages of paraffin or of methane hydrate, and thus adapts to a variety of environments such as wells situated at great depths or hydrocarbon deposits at low temperatures.

Another advantage is that good thermal insulation of the floor-to-surface link pipe is achieved all the way along its outer wall.

Also advantageously, the passive thermal protection can be used without any external installation for supplying heating energy.

An advantage is also that the double-walled pipe segments manufactured in accordance with the invention have longer lives after they are installed on site. The double-walled pipe segments and the pipe assembled from the double-walled pipe segments have, in particular, resistance to impacts that might take place against the drilling rig.

Another advantage is that the female bayonet-piece makes it possible to provide guiding in translation before the screwing-together, which is thus facilitated.

BRIEF DESCRIPTION OF THE DRAWINGS

Other characteristics, advantages, and details of the invention can be better understood on reading the following supplementary description of embodiments given by way of example and with reference to the drawings, in which:

FIG. 7 shows the tightening and holding zones, at the junction between two adjacent double-walled piped segments;

FIG. 8 shows a manipulation element designed to be fastened temporarily to the end of a double-walled pipe segment.

DETAILED DESCRIPTION OF PREFERRED EMBODIMENTS

Figure 9:
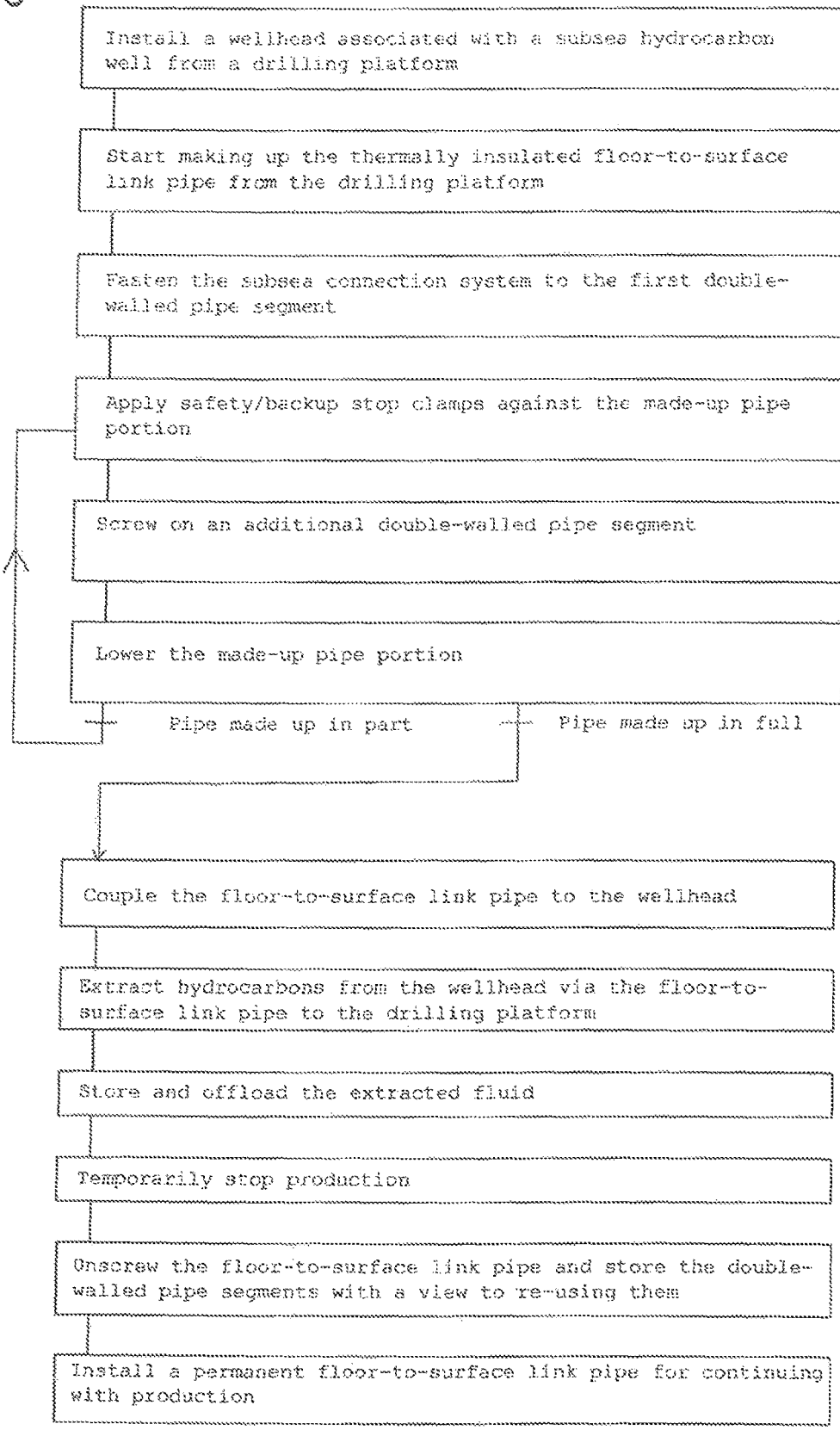
FIG. 9 shows an example of a method of commissioning a subsea hydrocarbon well.

The invention is described in more detail below. FIG. 9 shows an example of a method of commissioning a subsea hydrocarbon well. The various steps of the method are described in detail with reference to FIGS. 1 to 8.

Figure 1:
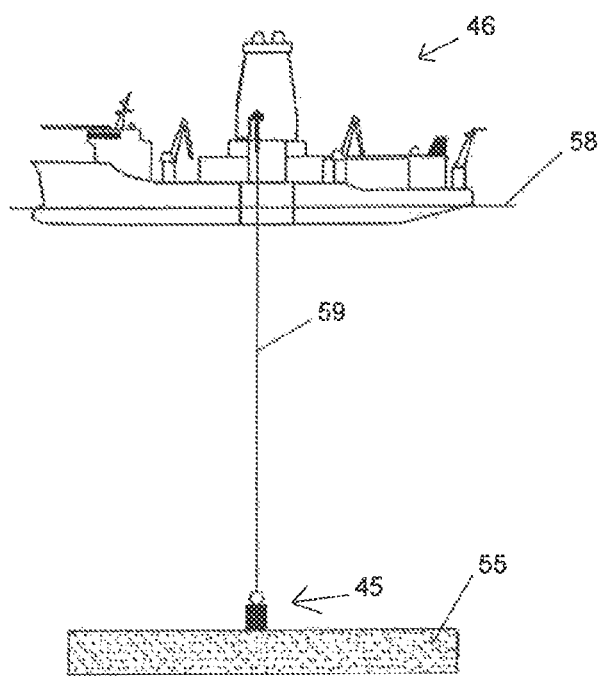
FIG. 1 diagrammatically shows installation of a wellhead from a drilling rig.

FIG. 1 diagrammatically shows installation of a subsea wellhead. The depth between the sea surface 58 and the sea floor 55 can be as high as 1,000 m, or even 3,000 m. The drilling rig 46 makes it possible to install a subsea well with its wellhead 45. For example, a cable 59 is used to lower the various component elements of the wellhead 45 down to the sea floor 55.

Figure 2:
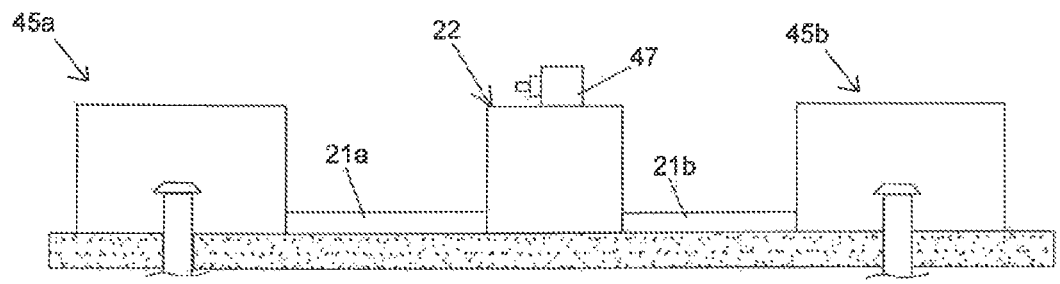
FIG. 2 shows a variant subsea installation comprising a plurality of wellheads.

The planned production of hydrocarbon may be achieved directly from a wellhead or else from subsea equipment interconnecting a plurality of wellheads 45a and 45b, as shown in FIG. 2. For example, subsea equipment 22 having a subsea connection 47 may be connected via pipes 21a and 21b to the wellheads 45a and 45b.

After putting in place the wellhead or the subsea installation interconnecting a plurality of wellheads, the floor-to-surface link pipe is assembled or "made up" from the drilling rig 46. Floor-to-surface link pipes may also be referred to as "risers". The drilling rig on the surface 46 is of the type making it possible to screw pipe segments together end-to-end and to lower them gradually down into the water.

Figure 3:
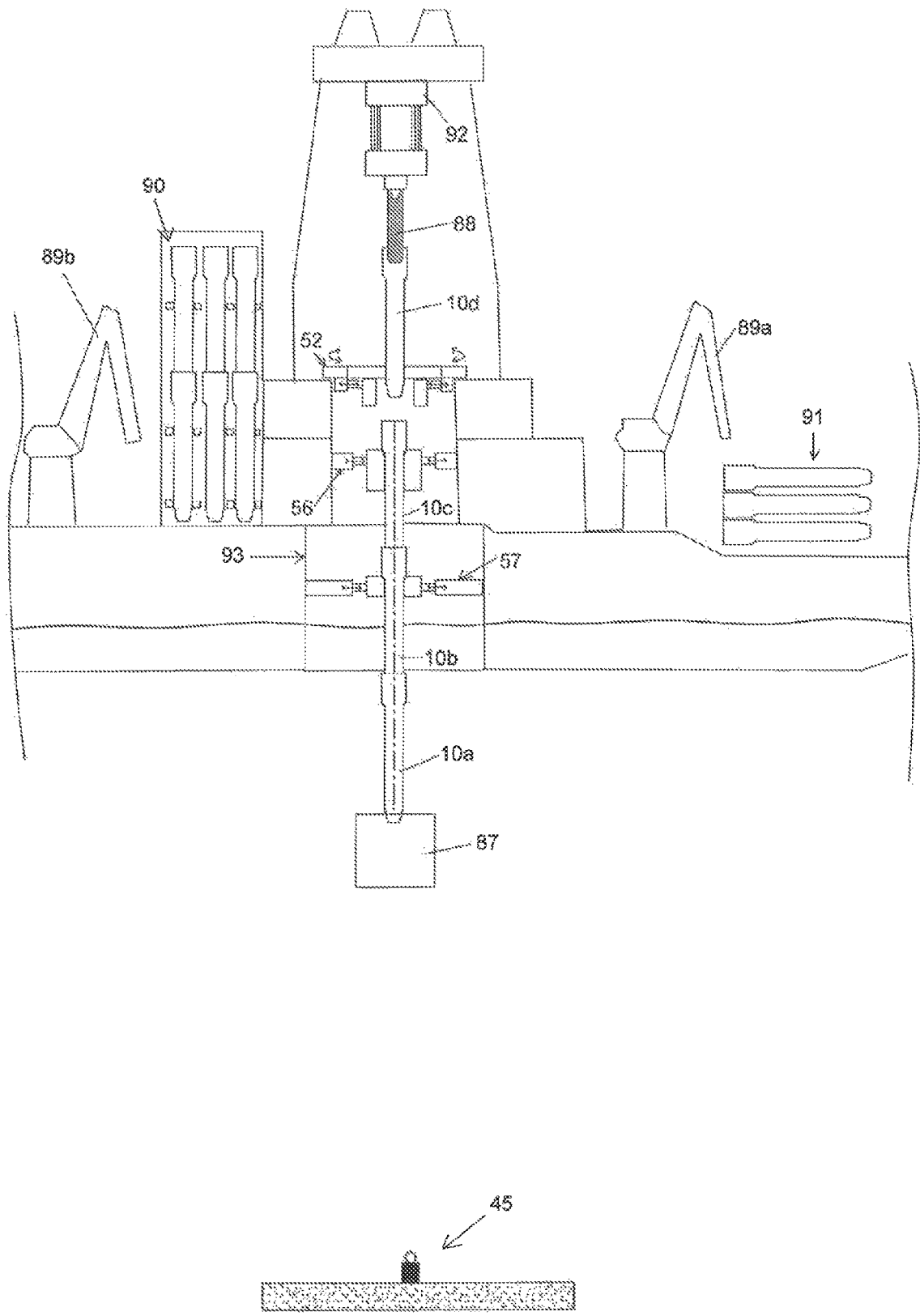
FIG. 3 diagrammatically shows assembly or "makeup" of the floor-to-surface link pipe.

FIG. 3 shows an example of a drilling rig for screwing the pipe segments together end-to-end. A connection system 87 is fastened to the first pipe segment 10a, i.e. to the lowest pipe segment. This connection system 87 is designed to form a subsea connection, e.g. by means of a subsea Remotely Operated Vehicle (ROV). This type of connection 87 may, in particular, be implemented down at a depth of as great as 3,000 m. The connection system 87 may advantageously be provided with thermal insulation or lagging.

It is also possible to provide intermediate connectors as a function of the type of subsea connection 47 of the subsea equipment connected to the wellhead(s) producing the hydrocarbons.

Each of the pipe segments 10a, 10b, 10c, and 10d screwed together end-to-end is thermally insulated.

The drilling rig includes an opening 93 passing through the hull of the drilling vessel and above which, in particular, a crane 92 is disposed. The floor-to-surface link pipe is thus assembled gradually by said crane 92 and lowered via the opening 93. The thermally insulated double-walled pipe segments are brought by other cranes 89a and 89b from storage zones 90 and 91 to the assembly or "makeup" crane 92. For example, the pipe segments are stored flat or vertically.

For example, an intermediate element 88 is screwed temporarily to a double-walled pipe segment 10d for enabling said double-walled pipe segment 10d to be manipulated by the assembly crane 92.

The double-walled pipe segments may also be previously screwed-together using secondary tightening tongs or wrenches (not shown) to form assembled sets 90, each comprising a plurality of pipe segments, which sets are stored on the drilling rig. The crane 92 performing the assembly then uses said sets, each of which is, for example, a set of two or three doubled-walled pipe segments, for assembling or "making up" the floor-to-surface link pipe. The installation time is thus reduced.

The portion of the pipe that is already assembled is, for example, held by safety or backup stop clamps 56 and 57.

The drilling rig also includes two tightening tongs or wrenches 52 and 56 co-operating with the crane 92 for assembling or "making up" the floor-to-surface link pipe. For example, the upper tongs 52 are mounted to rotate relative to the lower tongs 56 so as to exert determined tightening torque between two adjacent pipe segments 10c and 10d. The upper tongs exert action on the added pipe segment 10d while the lower tongs exert action on the most recently assembled pipe segment 10c.

Prior to the screwing-together or "makeup", the safety or backup stop clamps 56 and 57 can be applied against the outer metal pipe and below shoulders situated on the portion of the pipe that is already assembled. One of the tongs can thus perform the function of safety or backup stop clamp.

For example, each segment may have a length lying in the range 8 m to 20 m. After one or more pipe segments have been screwed on in addition to the portion of pipe that has already been assembled, the resulting portion of pipe is lowered, e.g. by means of the crane. The safety or backup stop clamps are, for example, released before the lowering.

The portion of pipe is lowered until the most recently assembled doubled-walled pipe segment reaches the level of the lower tongs.

The safety or backup stop clamps are then applied once again. A new double-walled pipe segment or a new set made up of a plurality of double-walled pipe segments can then be screwed to the top end of the already assembled portion of pipe.

The operations are repeated until the floor-to-surface link pipe is fully assembled or "made up".

Assembling the pipe segments together end-to-end thus makes it possible to reach the wellhead 45.

It is then possible to connect the floor-to-surface link pipe 23 to the wellhead. The connection system 87 is connected by a subsea ROV to the connection member 47 of the wellhead or to the connection member 47 of a subsea installation.

Figure 4:
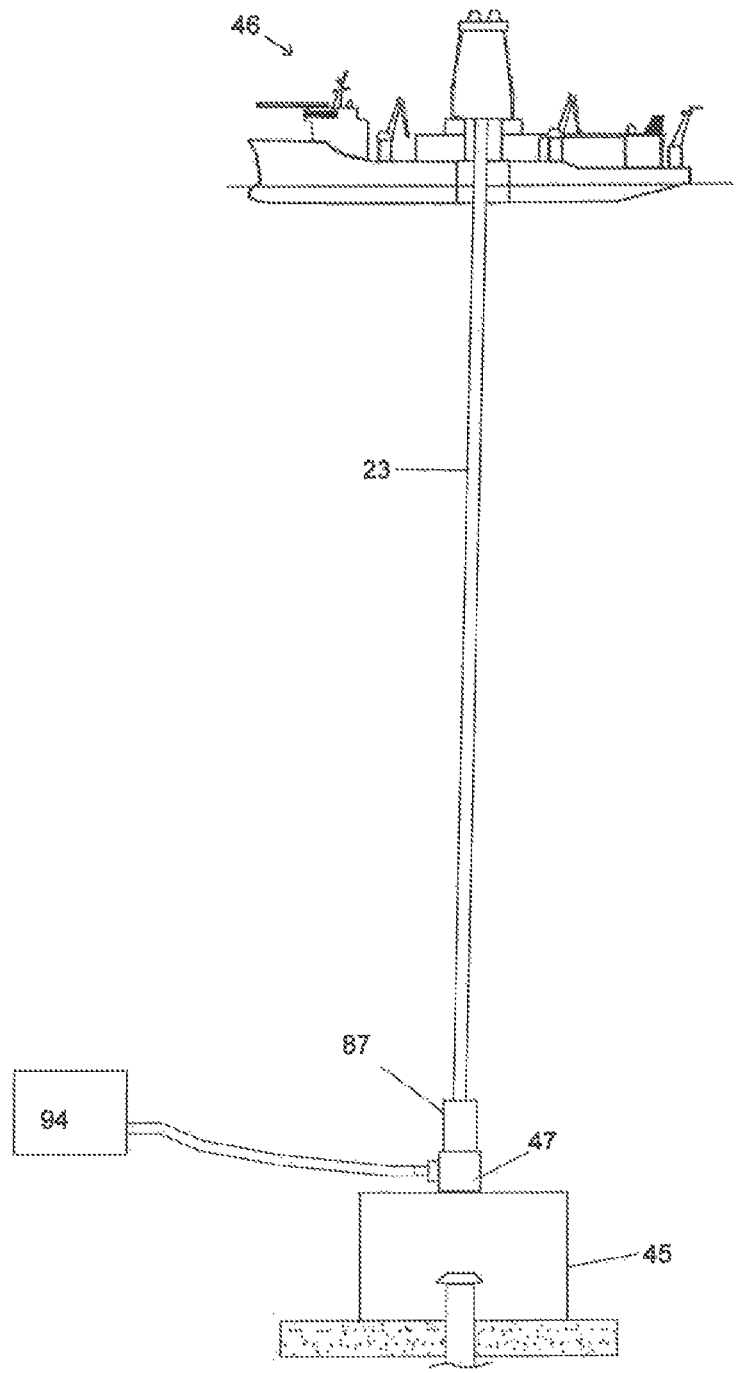
FIG. 4 shows the junction between the floor-to-surface link pipe and the wellhead.

FIG. 4 diagrammatically shows the link or coupling between the floor-to-surface link pipe 23 and the wellhead 45.

A similar connection may also be implemented between the floor-to-surface link pipe and subsea equipment interconnecting a plurality of wellheads, as described above with reference to FIG. 2.

A control member 94 for controlling the wellhead may, for example, cause it to open or to close. The control member 94 is, for example an ROV exerting an action on a valve for opening or closing the wellhead. A surface control member may also be used to cause the wellhead to open or to close. The hydrocarbons are then extracted via the floor-to-surface link pipe 23. The hydrocarbons being extracted via the floor-to-surface link pipe 23 rise to the surface and to the drilling rig to which the pipe 23 is fastened. Once it has arrived at the surface, the extracted fluid can be stored and offloaded.

By means of the thermally insulated floor-to-surface link pipe, the temperature of the hydrocarbons that are rising decreases to a small extent only, e.g. by in the range 1° C. to 8° C. as a function of the height of the pipe 23 and as a function of the quantity of gas in the hydrocarbons being collected. The gas expands while rising up the pipe 23 and such expansion, by absorbing heat, cools the fluid being extracted.

By means of the thermal insulation of the floor-to-surface link pipe, the hydrates and the paraffins contained in the fluid being extracted are not deposited on the inside surface of the pipe 23. The risks of blockage are thus reduced considerably or indeed removed. Otherwise, the riser would quickly become blocked by such deposits of hydrates or of paraffins, which would stop production.

Figure 5:
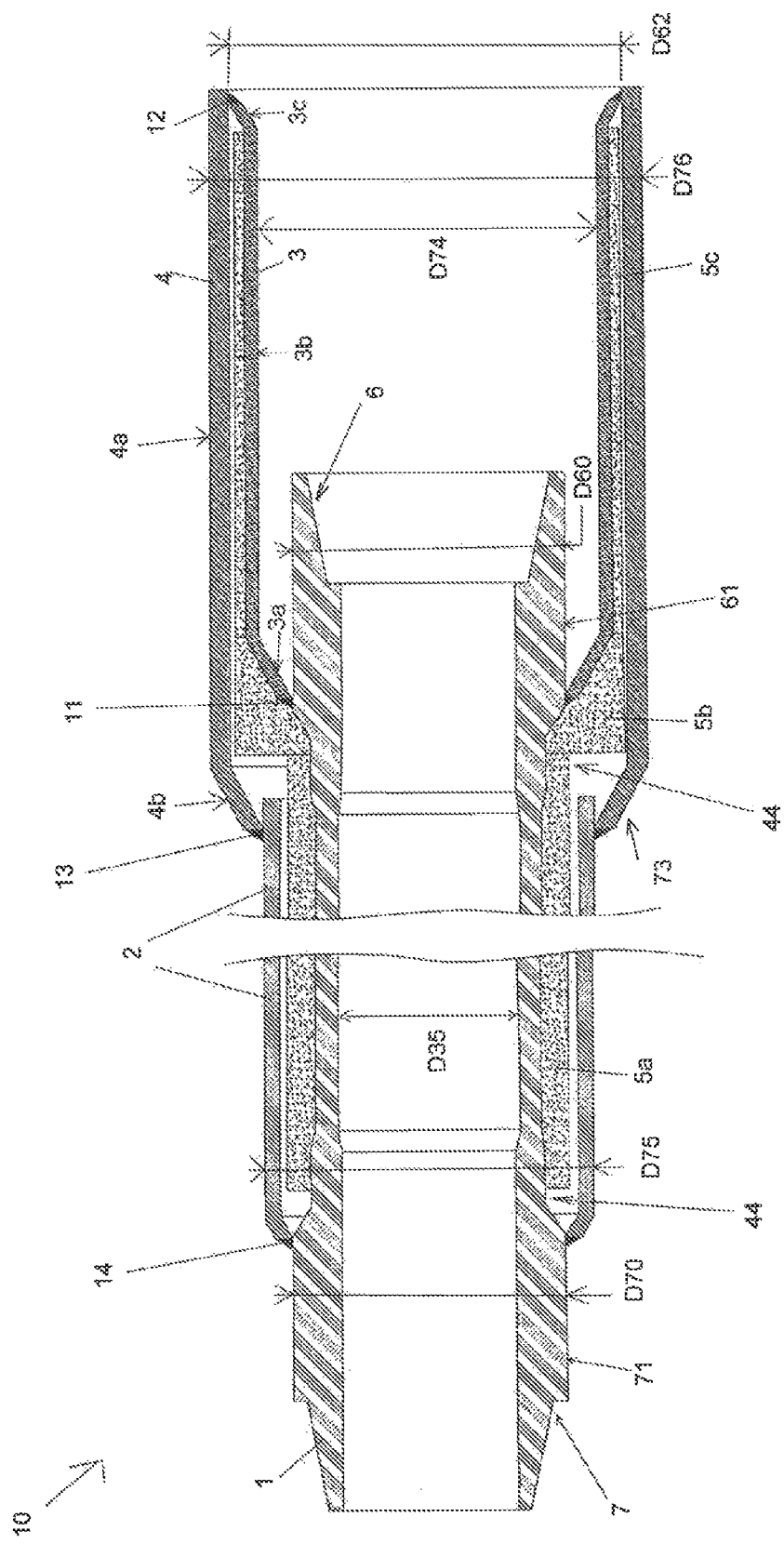
FIG. 5 is a section view of a double-walled pipe segment.

In order to implement the floor-to-surface link pipe 23, a particular type of double-walled pipe segment, as shown in FIG. 5, may be used.

The double-walled pipe segment comprises:
- a single-walled connection and transport pipe segment 1;
- a female metal bayonet-piece 3 welded or otherwise bonded to a threaded reinforced end 6 of the single-walled pipe segment 1;

thermally insulating material 5a, 5b, and 5c disposed around the single-walled connection and transport pipe segment 1 and around the female bayonet-piece 3;

an outer metal pipe 2 welded or otherwise bonded to a threaded reinforced end 7 of the single-walled connection and transport pipe 1;

a metal cover-piece 4 welded or otherwise bonded firstly to the female bayonet-piece 3 and secondly to the outer pipe 2.

The single-walled pipe segment 1 is resistant to the stresses encountered out in the open sea and has first and second threaded reinforced ends 6 and 7, one of which is a male end and the other of which is a female end. The male reinforced end 7 includes an end portion that is beveled and threaded on its outside surface. The female reinforced end 6 includes an inside surface that beveled and threaded.

Between its two reinforced ends, the single-walled pipe segment has a central tube made of steel having, for example, high yield strength of greater than or equal to 95 ksi and preferably of greater than 105 ksi. For example, the central tube has a thickness lying in the range 8 millimeters (mm) to 16 mm.

The central tube, which, for example, has an outside diameter of 168 mm, is joined, at each end, to a respective first wider portion, e.g. having a diameter of 175 mm, itself extended by a respective wider portion that, for example, has a diameter of 205 mm, which portion 61, 71 has a tightening diameter and constitutes a tightening portion. The thickness of the wall of the single-walled pipe segment 1 is thus reinforced at its ends.

The reinforced and threaded ends 6 and 7 of the single-walled connection and transport pipe segment 1 are further made of a steel having, for example, a very high yield strength that is greater than or equal to 100 ksi, and that is preferably greater than or equal to 120 ksi. The reinforced and threaded ends 6 and 7 are also referred to as "tool joints". For example, such a single-walled connection and transport pipe segment may have a length lying in the range 7 m to 15 m. In particular, this type of single-walled pipe segment 1 has mechanical characteristics making it resistant to the stresses encountered out in the open sea.

The single-walled pipe segment 1 is designed to be connected to a single-walled pipe segment of an adjacent double-walled pipe segment. The interconnected single-walled pipe segments thus form the inner wall inside which the hydrocarbons are transported. For example, the inside diameter D35 of the transport inner wall lies in the range 120 mm to 140 mm. The double-walled pipe segments of the invention can thus withstand internal pressure of up to 1,000 bars, e.g. by means of reinforced threaded connection ends, each having two shoulders.

The single-walled pipe segment is welded or otherwise bonded firstly via its threaded reinforced end 6 to the narrower portion 3a of the female bayonet-piece 3, the weld or bond 11 being formed on a tightening portion 61 having the tightening diameter D60. For example, said weld or bond 11 is formed on the tightening portion 61 as far away from the thread as possible. For example the narrower portion 3a of the female bayonet-piece 3 may be obtained by pinching.

The single-walled pipe segment is welded or otherwise bonded secondly via its threaded reinforced end 7 to one end of the outer pipe 2, the weld or bond 14 being formed on a tightening portion 71 having the tightening diameter D70. For example, said weld or bond 14 is formed on the tightening portion 71 and as far away from the thread as possible. The outer pipe 2 is welded or otherwise bonded to the single-walled pipe segment via a narrower portion, obtained, for example, by pinching.

Each female bayonet-piece is associated with the female reinforced end 6 of each segment 1, and the outer pipe 2 is fastened to the male end 7 of the single-walled connection and transport pipe segment. In a variant, it is possible to make provision to fasten each female bayonet-piece to the male reinforced end of each single-walled pipe segment while the outer pipe is fastened to the female reinforced end.

The cover-piece 4 includes a cylindrical portion 4a fastened at one end via a weld or other type of bond 12 to a wider end portion 3c of the female bayonet-piece. This wider end 3c represents the maximum diameter D62 of the female bayonet-piece. The end of the cover-piece 4 constitutes the end of the double-walled pipe segment 10 and comes in front of the threaded end 6 of the single-walled connection and transport pipe segment 1. For example, the wider portion of the bayonet-piece may be obtained by flaring.

The cylindrical portion 4a of the cover-piece 4 is also extended by a narrower portion 4b fastened by a weld or by some other bond 13 to the outer metal pipe 2. For example, the narrower portion 4b of the cover-piece may be obtained by pinching.

The outer metal pipes 2, the cover-pieces 4 and the female bayonet-pieces 3 of the double-walled pipe segments as assembled end-to-end thus form the outer wall of the floor-to-surface link pipe 23.

The welds or bonds are formed in such a manner as to make it possible to transmit determined tightening torque that is applied to the outer pipe 2. The tightening torque is applied firstly in the vicinity of the weld or bond 13 for securing the cover-piece 4b to the outer wall 2, and secondly in the vicinity of the weld or bond 14 for securing the outer wall 2 to the single-walled pipe segment 1.

The two tongs are thus applied to two adjacent segments on either side of a cover-piece so as to form the junction by screw-fastening. For example, the tightening torque may lie in the range 50,000 newton meters (N.m) to 65,000 N.m.

In particular, the outer pipe 2 is of inside diameter greater than the outside diameter of the reinforced ends 6 and 7 of the single-walled pipe segment 1. The length of the outer pipe 2 is designed so that it comes against a tightening portion 71 of one of the reinforced ends and to the level of the start of the opposite reinforced end of the same single-walled pipe segment.

For example, the outer pipe 2 may have a thickness lying in the range 8 mm to 15 mm. The material used for the outer pipe 2 is steel that, for example, has high yield strength that is greater than or equal to 65 ksi and preferably at least 80 ksi. Its strength is such that it can withstand, in particular, lateral forces and pressures in marine environments, at depths lying in the range 500 m to 3,000 m.

In particular, the female bayonet-piece 3 includes a cylindrical portion 3b extended firstly by a narrower portion 3a welded or otherwise bonded to the tightening portion 61 of the threaded reinforced end 6, and secondly by its wider portion 3c.

Figure 6:
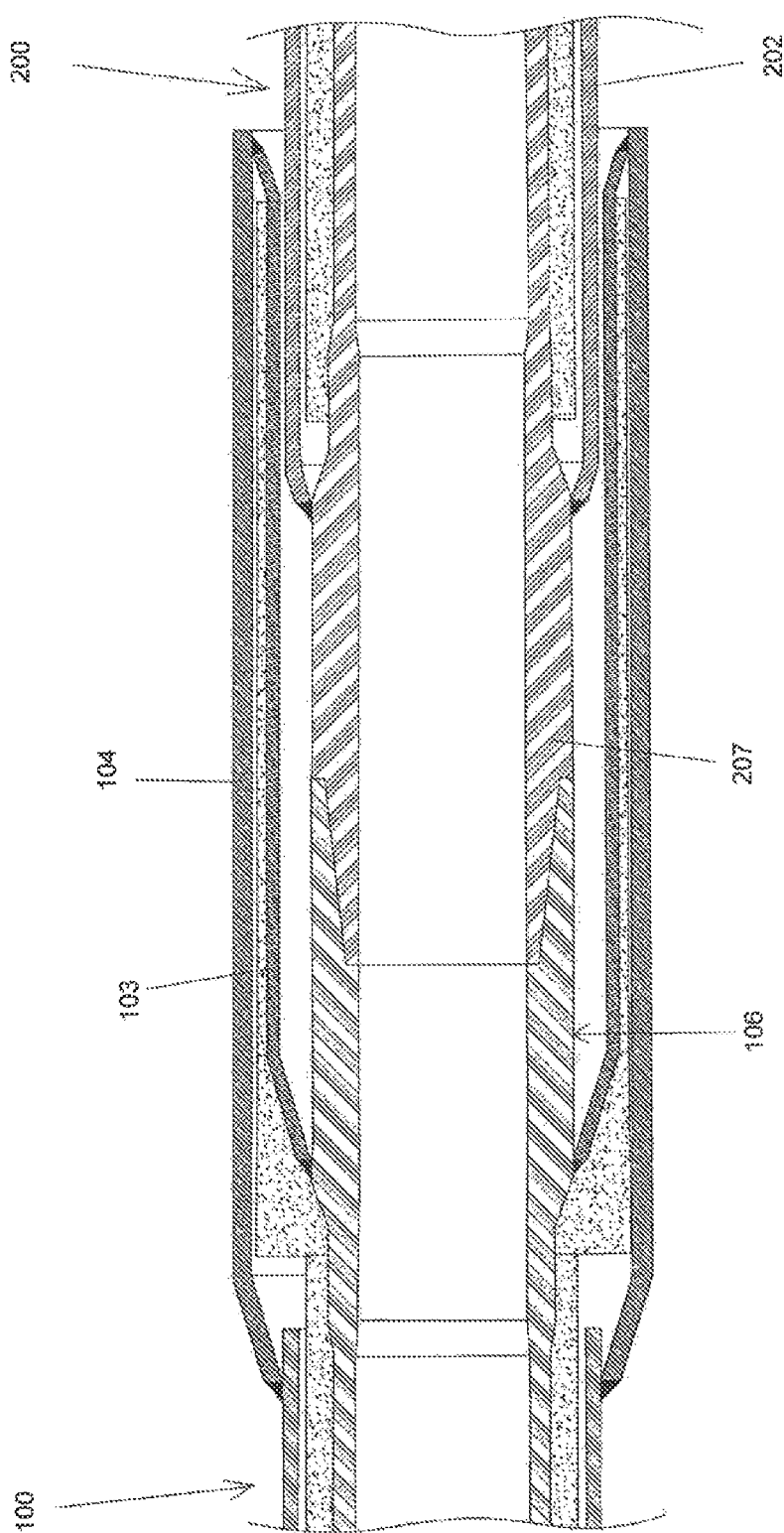
FIG. 6 is a section view of a mechanical link between two adjacent double-walled pipe segments.

The narrower portion 3a has an inside diameter corresponding to the tightening diameter D60 of the reinforced ends of the single-walled pipe segment 1. The inside diameter D74 of the cylindrical portion 3b of the female bayonet-piece is greater than the outside diameter D75 of the outer pipe 2. Working clearance thus enables the bayonet-piece to overlap the outer pipe 2 of an adjacent double-walled pipe segment as shown in FIG. 6 and as described below.

For example, the length of the female bayonet-piece 3 may lie in the range 800 mm to 1,400 mm. This length is designed, in particular, so that said female bayonet-piece comes in front of the reinforced end to which it is fastened, so that it overlaps this reinforced end and also so that it overlaps the outer pipe of the adjacent double-walled pipe segment.

For example, the bayonet-piece 3 may have a thickness lying in the range 6 mm to 12 mm. The female bayonet-piece 3 is made of high yield strength steel having, for example, an elastic limit of at least 65 ksi, and preferably of at least 80 ksi.

In particular, the cover-piece 4 includes a cylindrical portion 4a extended by a narrower portion 4b of inside diameter corresponding to the outside diameter D75 of the outer pipe 2. The difference between the outside diameter D75 of the outer pipe 2 and the outside diameter D76 of the cover-piece 4 forms a shoulder 73 that can serve as a stop, as explained below.

The inside diameter of the cylindrical portion 4a corresponds to the outside diameter of the wider portion 3c of the female bayonet-piece 3. A space 44 for the insulating material is thus available between the cover-piece 4 and the bayonet-piece 3. This space 44 is also extended by the space available between the outer pipe 2 and the single-walled pipe segment 1.

The cover-piece 4 is of length enabling it to extend from the wider end 3c of the female bayonet-piece to the outer pipe 2. The cover-piece thus fully covers the female bayonet-piece 3 and partially covers, i.e. overlaps, the outer pipe 2. For example, the cover-piece may have a length lying in the range 1,100 mm to 1,700 mm. For example, the thickness of the cover-piece 4 may lie in the range 10 mm to 22 mm.

The cover-piece 4 is made of a steel which, for example, has yield strength greater than or equal to 65 ksi, and preferably at least 80 ksi. For example, the cover-piece 4 is made of the same high yield strength steel as the female bayonet-piece 3.

The thermally insulating material 5a, 5b, and 5c is disposed around the single-walled connection and transport pipe segment 1 and around the female bayonet-piece 3. The thermally insulating material 5a, 5b and 5c is covered by the cover-piece 4 and by the outer pipe 2. The insulating material is thus disposed in a closed and sealed space 44.

For example, the thermally insulating material is a solid material, such as a microporous material. The open-pore thermally insulating material is, for example, based on fumed silica. Advantageously, such a material put under a low pressure makes it possible to provide thermal insulation that is particularly effective. The space 44 in which the thermally insulating material is installed is then dried.

Advantageously, such a double-walled pipe segment 10 that is put at a low pressure keeps its thermal insulation properties throughout its life. The thickness of thermally insulating material is designed with working clearance relative to the inside diameter of the pipe covering the thermally insulating material, in particular for facilitating putting it at low pressure. For example, the pressure is set to be lower than 1 bar or than a few millibars.

FIG. 6 is a section view of a mechanical link between two adjacent double-walled pipe segments 100 and 200. This figure shows, in particular, that the inside diameter of the cylindrical portion of the female bayonet-piece 103 is greater than the outside diameter of the outer pipe 202, the female bayonet-piece 103 coming in front of the reinforced end 106 fastened to the bayonet-piece in such a manner as to cover the reinforced end 207 of the adjacent double-walled pipe segment 200 and as to overlap the outer pipe 202 of the adjacent doubled-walled pipe segment 200.

The end-to-end assembly of the double-walled pipe segments 100 and 200 makes it possible to put in place rapidly a floor-to-surface link pipe 23 having good thermal insulation.

The coefficient of thermal transmittance U of a double-walled pipe segment of the invention may reach 3 watts per square meter Kelvin (W/m$^2$.K) and even 0.5 W/m$^2$.K. The floor-to-surface link pipe may thus have the same coefficient of thermal transmittance U.

The thread inside the bayonet-piece can be accessed for manipulating the pipe segment by means of an extension element, as described below with reference to FIG. 8.

The double-walled pipe segments have a long lifespan, in particular due to their resistance to mechanical fatigue and, by means of their capacity to withstand multiple assemblies and disassemblies. For example, a double-walled pipe segment may withstand at least 100 assemblies and disassembles without significant degradation or damage.

FIG. 7 shows the tightening and holding zones, at the junction between two adjacent double-walled piped segments.

The tightening tongs 56 are placed on the outer metal pipe against the abutment created by the cover-piece. Tightening tongs comprise, in particular, two jaws applied to the outer pipe segment. The tightening torque is transmitted via the cover-piece and via the female bayonet-piece, which, in particular, has an S-shaped half-profile.

For example, the maximum diameter of the female bayonet-piece lies in the range 130% of the tightening diameter of the reinforced end of the single-walled connection and transport pipe segment to 170% of said tightening diameter.

During screwing-together of two double-walled pipe segments, tightening tongs 56 come to clamp the metal outer pipe of the already assembled pipe portion, and tightening tongs 52 come to clamp that outer pipe of the double-walled pipe segment added to the already installed pipe portion.

As explained above, the welds or bonds of the outer pipe, of the cover-piece, and of the female bayonet-piece make it possible to transmit the tightening torque to the reinforced and threaded ends of the single-walled connection and transport pipe segment.

Another feature of assembly or make-up of the floor-to-surface link pipe 23 is that the total mass is substantially doubled relative to the total mass of a single-walled pipe assembled or made up by screwing pipe segments together. The mass of the connection system 87, representing in the range 5 metric tons (tonnes) to 80 tonnes, should also be added.

Thus, for improving the holding by the tightening tongs, the pressure exerted is optimized within the limit of the mechanical strength of the double-walled pipe segment, and the tightening surface area is also optimized. The jaws of the tightening tongs are, for example, elongate and the pressure is increased relative to the pressure exerted for assembling a drill string. For example, the jaws of the tongs have a length L56 or L52 lying in the range 500 mm to 5,000 mm.

Since the jaws are of long lengths, the surface area of friction between the jaws and the outer pipe is also large.

Thus, it is possible to find a compromise adapted to assembling the floor-to-surface link pipe 23, for determining the length of the jaws and the pressure exerted by said jaws.

The working heights in the drilling rig can be modified to accept longer jaws than for the drilling operations.

In addition, one of the tightening jaws also forms a stop clamp coming into abutment against the base of the cover-piece 4. The height H99 between the diameter of the outer pipe and the diameter of the cover-piece procures a bearing surface for the jaw 56 that can then support the weight of the floor-to-surface link pipe 23.

If an incident occurs and the jaws that are holding the floor-to-surface link pipe slip, this increase in diameter serves as an abutment and stops the floor-to-surface link pipe. Such an abutment then prevents the pipe 23 from falling to the bottom of the sea.

It is also possible to provide a plurality of safety/backup and stop clamps applied to a plurality of portions of the floor-to-surface link pipe.

FIG. 8 shows an extension element 88 fastened to the end of a double-walled pipe segment for manipulating it.

During manipulation of the thermally insulated doubled-walled pipe segments on the drilling rig, an extension element is provided to adapt to the particular geometrical configuration of the double-walled pipe segments.

This extension is used, in particular, by the assembly or make-up crane. The extension element 88 is provided with a male thread 301 and a female thread 302 of the same dimension as the threads of the single-walled pipe segments of each double-walled pipe segment. For example, the extension may have a length L88 lying in the range 2 m to 10 m. This extension 88 may be temporarily screwed to a double-walled pipe segment in order to manipulate it.

The extension 88 thus makes it possible to access the thread set back inside the cover-piece. The extension has reinforced threaded ends interconnected via a solid tube. The coupling via threads may also include a double shoulder for increasing the strength of the assembly by screw-fastening. This extension may, in particular, constitute an extension to the assembly crane.

It should be clear to the person skilled in the art that other variant embodiments of the present invention are possible. Therefore, these embodiments should be considered merely as illustrations of the invention.

What is claimed is:

1. A method of commissioning at least one subsea hydrocarbon well terminating by a wellhead, from a petroleum drilling rig, wherein said method comprises:
    screwing double-walled pipe segments together in mutual succession to form a thermally insulated floor-to-surface link pipe comprising an inner pipe for transporting hydrocarbons, and an outer pipe, wherein a thermally insulating material is disposed between said inner and outer pipes;
    connecting said floor-to-surface link pipe to said wellhead; and
    extracting the hydrocarbons via said floor-to-surface link pipe to said drilling rig on the surface,
    wherein each of said double-walled pipe segments comprises:
    a single-walled connection and transport inner metal pipe, resistant to open-sea stresses and provided with first and second threaded reinforced ends;
    a female metal bayonet-piece disposed around said first threaded reinforced end, said female bayonet-piece comprising a cylindrical portion extended at one end by a narrower portion that is welded or otherwise bonded to a tightening portion of said first threaded reinforced end, and at the other end by a wider portion;
    a portion of said thermally insulating material disposed around the single-walled connection and said transport inner metal pipe segment and around said female bayonet-piece,
    an outer metal pipe provided with a narrower portion welded or otherwise bonded to a tightening portion of said second threaded reinforced end; and
    a metal cover-piece disposed around said female bayonet-piece, said cover-piece having a cylindrical portion welded or otherwise bonded at one end to the wider end portion of the female bayonet-piece, and being extended at the other end by a narrower portion welded or otherwise bonded to said outer pipe;
    each of said double-walled pipe segments being arranged in such a manner that tightening torque can be applied for screwing two adjacent double-walled pipe segments together by tightening tongs applied against said outer metal pipe of each of said two adjacent double-walled pipe segments.

2. The method of commissioning according to claim 1, wherein said tightening torque for tightening said two adjacent double-walled pipe segments is exerted by two tightening tongs exerting their action on said outer metal pipe of each of said double-walled pipe segments at either end of and as close as possible to said cover-piece of one of said two double-walled pipe segments in such a manner as to transmit the tightening torque to said reinforced ends that are screwed together at said cover-piece.

3. The method of commissioning according to claim 2, wherein at least one safety or backup stop clamp is positioned prior to the screwing together, said cover-piece forming a shoulder between a maximum diameter (D76) and a minimum diameter (D75) of said cover-piece, which said shoulder forms a bearing surface against said safety or backup stop clamp.

4. The method of commissioning according to claim 3, wherein, in each of said double-walled pipe segments, said female bayonet-piece has a maximum diameter (D62) lying in the range 130% of the diameter (D60) of said tightening portion of said first threaded reinforced end to 170% of said tightening diameter.

5. The method of commissioning according to claim 1, wherein, in each of said double-walled pipe segments, an inside diameter (D74) of said cylindrical portion of said female bayonet-piece is greater than an outside diameter (D75) of said outer metal pipe, said female bayonet-piece coming in front of said first threaded reinforced end in such a manner as to overlap said outer metal pipe of an adjacent double-walled pipe segment so as to form continuity in the thermally insulting material of said floor-to-surface link pipe.

6. The method of commissioning according to claim 1, wherein in each of said double-walled pipe segments, said thermally insulating material is of the solid type having open pores, and is based on fumed silica, the closed and sealed space disposed between said outer metal pipe and said single-walled connection and transport inner metal pipe segment being put at a low pressure.

7. The method of commissioning according to claim 1, wherein, in each of said double-walled pipe segments, said threaded reinforced ends of said single-walled connection and said transport inner metal pipe segment are made of a first steel having very high yield strength of at least 100 kilopounds per square inch (ksi) and while said cover-piece, said female bayonet-piece and said outer metal pipe are made of a same second steel having high yield strength of at least 65 ksi.

8. The method of commissioning according to claim 1, wherein, after a determined period of extraction:
production is temporarily stopped;
said floor-to-surface link pipe is disassembled by successively unscrewing or "breaking out" and storing said double-walled pipe segments; and
a new floor-to-surface link pipe is installed.

9. The method of commissioning according to claim 8, wherein said double-walled pipe segments are stored with a view to them being re-used for another subsea hydrocarbon well.

10. A floor-to-surface link pipe for commissioning at least one subsea hydrocarbon well terminating by a wellhead, from a petroleum drilling rig, said floor-to-surface link pipe being made up of a set of mutually interconnected double-walled pipe segments, wherein each of said double-walled pipe segment comprises:
a single-walled connection and transport inner metal pipe segment, resistant to open-sea stresses and provided with first and second threaded reinforced ends;
a female metal bayonet-piece disposed around said first threaded reinforced end, said female bayonet-piece comprising a cylindrical portion extended at one end by a narrower portion that is welded or otherwise bonded to a tightening portion of said first threaded reinforced end, and at the other end by a wider portion,
a portion of a thermally insulating material disposed around said single-walled connection and transport pipe segment and around said female bayonet-piece;
an outer metal pipe provided with a narrower portion welded or otherwise bonded to a tightening portion of said second threaded reinforced end; and
a metal cover-piece disposed around said female bayonet-piece, said cover-piece having a cylindrical portion welded or otherwise bonded at one end to said wider end portion of said female bayonet-piece, and being extended at the other end by a narrower portion welded or otherwise bonded to said outer pipe;
each of said double-walled pipe segments being arranged in such a manner that tightening torque can be applied for screwing two adjacent double-walled pipe segments together by tightening tongs applied against said outer pipe of each of said two adjacent double-walled pipe segments.

11. The floor-to-surface link pipe according to claim 10, wherein said tightening torque for tightening said two adjacent double-walled pipe segments is exerted by two tightening tongs exerting their action on said outer pipe of each of said double-walled pipe segments at either end of and as close as possible to said cover-piece of one of said two double-walled pipe segments in such a manner as to transmit said tightening torque to said reinforced ends that are screwed together at said cover-piece.

12. The floor-to-surface link pipe according to claim 10, said floor-to-surface link pipe is provided with at least one safety or backup stop clamp prior to the screwing together, said cover-piece forming a shoulder between a maximum diameter (D76) and a minimum diameter (D75) of said cover-piece, which said shoulder forms a bearing surface against said safety or backup stop clamp.

13. The floor-to-surface link pipe according to of claim 12, wherein, in each of said double-walled pipe segments, said female bayonet-piece has a maximum diameter (D62) lying in the range 130% of a diameter (D60) of said tightening portion of said first threaded reinforced end to 170% of said diameter.

14. The floor-to-surface link pipe according to claim 13, wherein, in each of said double-walled pipe segments, an inside diameter (D74) of said cylindrical portion of said female bayonet-piece is greater than an outside diameter (D75) of said outer pipe, said female bayonet-piece coming in front of said first threaded reinforced end in such a manner as to overlap said outer pipe of an adjacent double-walled pipe segment so as to form continuity in the thermally insulating material of said floor-to-surface link pipe.

15. The floor-to-surface link pipe according to claim 10, wherein, in each of said double-walled pipe segments, said threaded reinforced ends of said single-walled connection and transport pipe segment are made of a first steel having very high yield strength of at least 100 ksi while said cover-piece, said female bayonet-piece and said outer pipe are made of a same second steel having high yield strength of at least 65 ksi.

* * * * *